(12) United States Patent
Roth et al.

(10) Patent No.: US 12,365,098 B2
(45) Date of Patent: Jul. 22, 2025

(54) GRIPPER FOR A MANUPULATOR

(71) Applicant: System 3R International AB, Vaellingby (SE)

(72) Inventors: Walter Roth, St. Gallen (CH); Joel Eberhard, Bazenheid (CH)

(73) Assignee: SYSTEM 3R INTERNATIONAL AB, Vaellingby (SE)

( * ) Notice: Subject to any disclaimer, the term of this patent is extended or adjusted under 35 U.S.C. 154(b) by 831 days.

(21) Appl. No.: 17/549,899

(22) Filed: Dec. 14, 2021

(65) Prior Publication Data

US 2022/0193922 A1 Jun. 23, 2022

(30) Foreign Application Priority Data

Dec. 18, 2020 (EP) ..................................... 20215363

(51) Int. Cl.
*B25J 15/02* (2006.01)
*B25J 15/00* (2006.01)
*B25J 19/00* (2006.01)

(52) U.S. Cl.
CPC ....... *B25J 15/0028* (2013.01); *B25J 19/0066* (2013.01)

(58) Field of Classification Search
CPC .... B25J 15/009; B25J 15/028; B25J 15/0433; B25J 19/0058; B23Q 1/0072
USPC ......................................................... 294/207
See application file for complete search history.

(56) References Cited

U.S. PATENT DOCUMENTS

| | | | | |
|---|---|---|---|---|
| 4,416,577 A * | 11/1983 | Inaba | .................. | B25J 19/0058 409/137 |
| 4,545,723 A * | 10/1985 | Clark | ...................... | B25J 15/04 414/730 |
| 4,913,481 A * | 4/1990 | Chin | ...................... | B25J 15/028 294/207 |
| 5,595,413 A * | 1/1997 | McGeachy | .......... | B25J 15/0253 294/207 |
| 7,640,642 B2 * | 1/2010 | Okanda | ................ | B23Q 1/0081 409/134 |

(Continued)

FOREIGN PATENT DOCUMENTS

| | | | | |
|---|---|---|---|---|
| CN | 107433484 A | 12/2017 | | |
| DE | 102008023813 A1 * | 11/2009 | ............. | B23Q 7/045 |

(Continued)

*Primary Examiner* — Douglas A Hess
(74) *Attorney, Agent, or Firm* — LEYDIG, VOIT & MAYER, LTD.

(57) ABSTRACT

A gripper for a handling assembly grasps an object. The gripper includes: a coupler for mounting to the object; and a base body mountable to the handling assembly. The base body includes: a housing; a clamping bracket at an outside of the housing; and a clamping mechanism in the housing, connected to the clamping bracket. The clamping bracket has latched and unlatched states. In the latched state, the clamping bracket is drawn close to the housing. In the unlatched state, the clamping bracket is pushed away from the housing to receive the coupler between the clamping bracket and the housing. The clamping mechanism is activated by pneumatic/hydraulic driving to force the clamping bracket to change from the latched to the unlatched state, and deactivated such that the clamping bracket returns to the latched state, thereby clamping the coupler to the housing.

16 Claims, 6 Drawing Sheets

(56) References Cited

U.S. PATENT DOCUMENTS

| | | |
|---|---|---|
| 10,569,426 B2 * | 2/2020 | Komatsu .............. B25J 15/0433 |
| 2009/0079142 A1 | 3/2009 | Gross |
| 2015/0054211 A1 | 2/2015 | Hediger |
| 2018/0001427 A1 | 1/2018 | Hediger |
| 2018/0222056 A1 * | 8/2018 | Suzuki ................... B25J 9/0096 |
| 2018/0304428 A1 | 10/2018 | Hediger |

FOREIGN PATENT DOCUMENTS

| | | |
|---|---|---|
| DE | 102011080504 A1 | 2/2013 |
| JP | S58217634 A | 12/1983 |
| JP | 2014097547 A | 5/2014 |

* cited by examiner

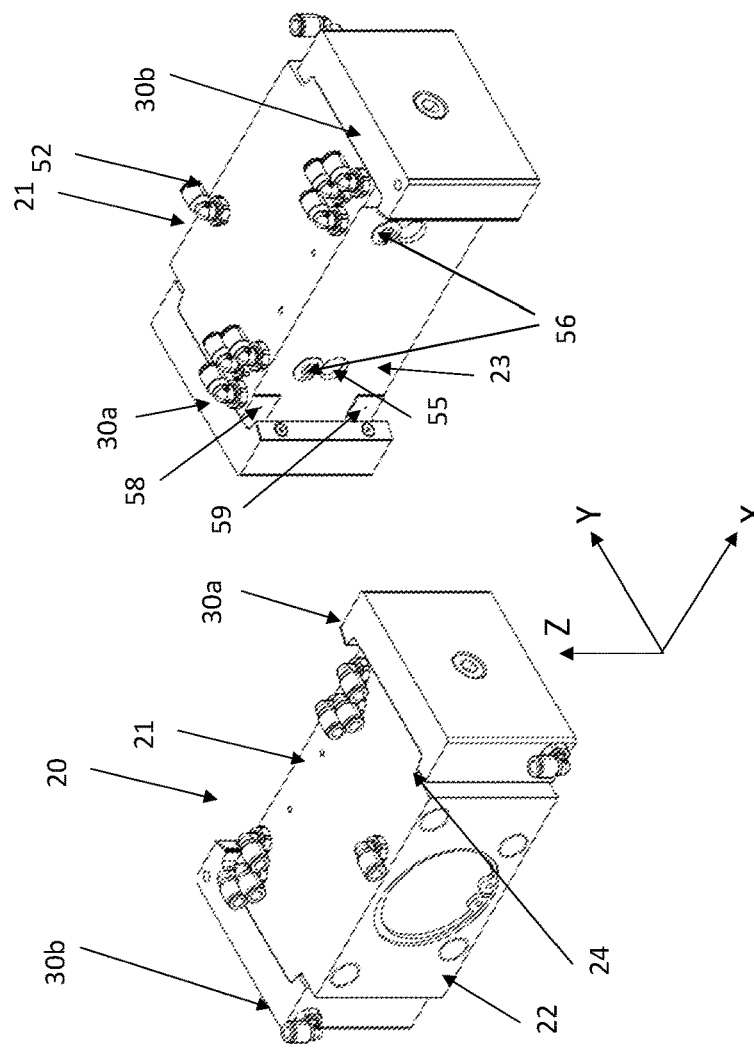
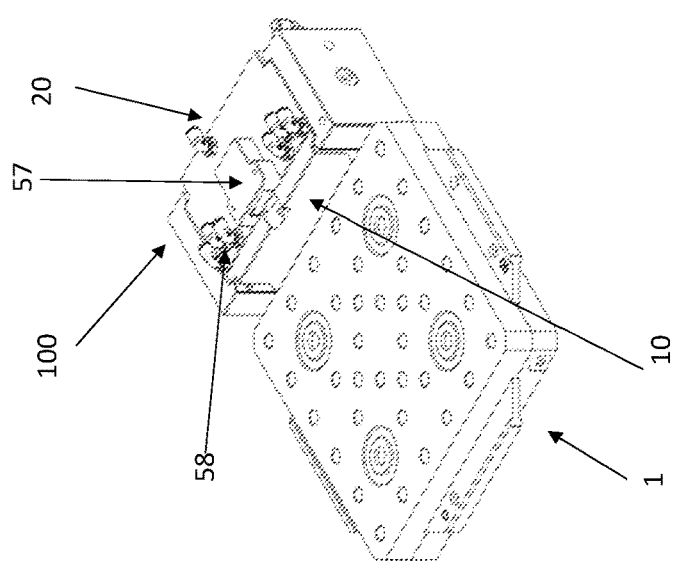
Fig.1

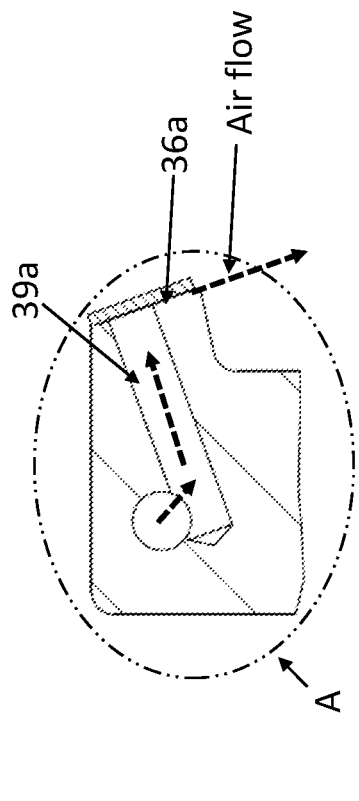
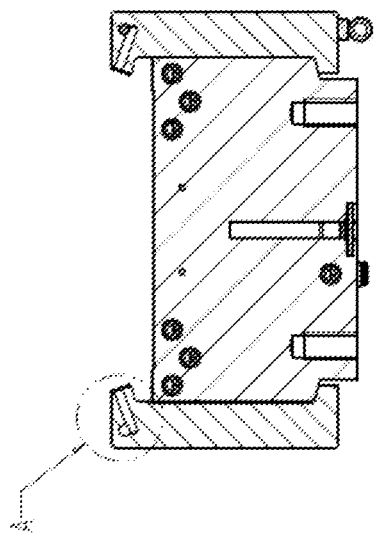
Fig.7b
Fig.7c
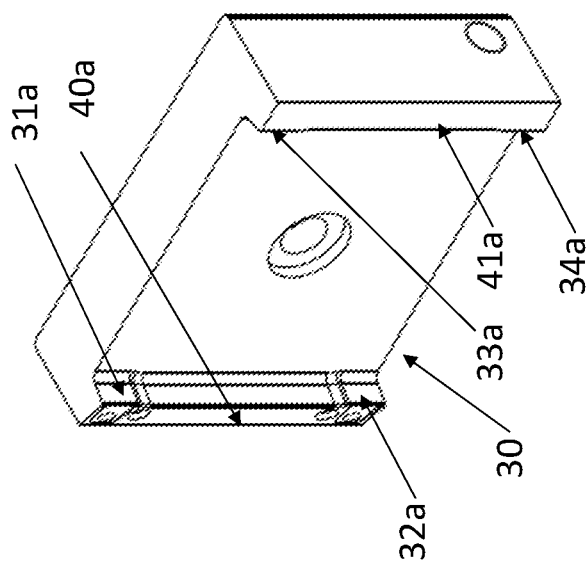
Fig.7a

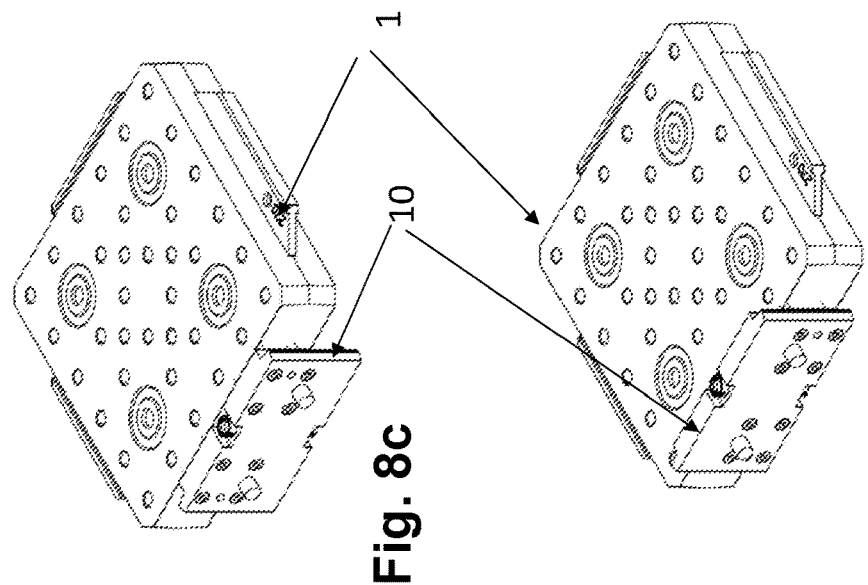
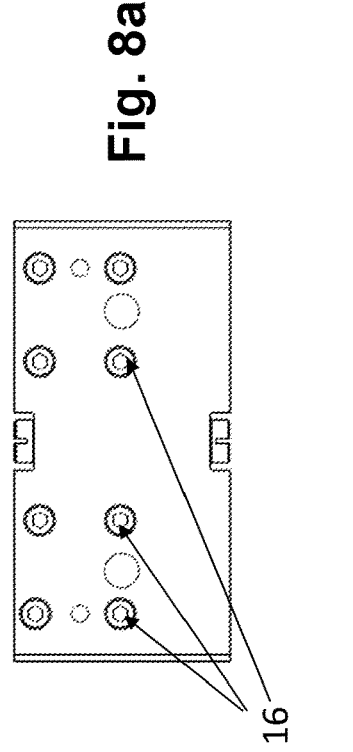

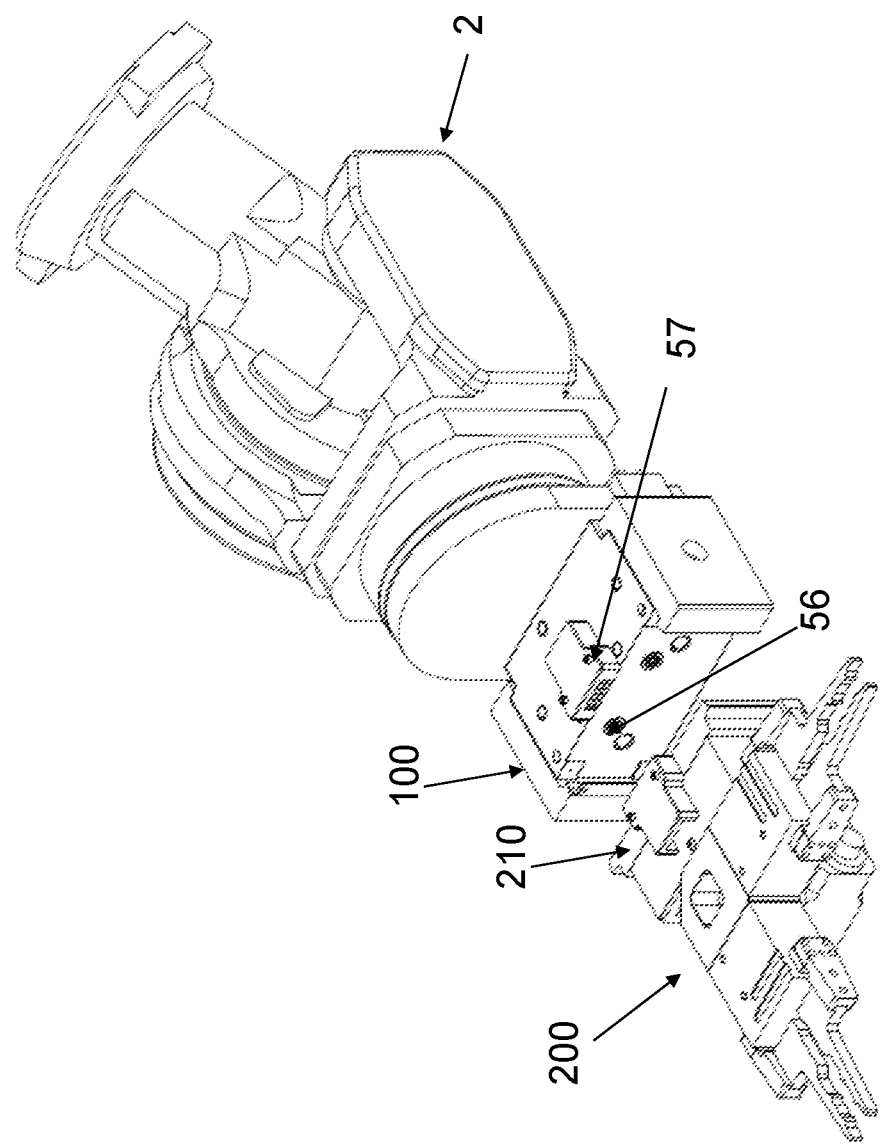

GRIPPER FOR A MANUPULATOR

CROSS-REFERENCE TO PRIOR APPLICATIONS

This application claims the benefit of European Patent Application No. EP 20 215 363.1, filed on Dec. 18, 2020, the entirety which is hereby incorporated by reference herein.

FIELD

The present invention is related to a gripper for an automatic handling assembly to load and unload an object, in particular for a handling robot. In particular, the present invention is directed to a gripper for a robot to grasp a pallet or a workpiece used in a machine tool.

BACKGROUND

An automatic handling assembly is a device, which is capable of automatically carrying out specific actions in an industrial environment, for example a handling robot. Automation can increase the production sufficiency. One of frequently used automation action is loading and unloading objects. One particular application is in the machining industry. Before machining, a workpiece must be first loaded into the machine tool and after the machining, the produced part must be unloaded from the machine tool. Normally, the workpiece is mounted on a pallet having clamping means, such that the pallet can be automatically clamped on a machine table in a machine tool. For such application, the handling robot is often applied to take the pallet having the workpiece to be machined thereon from a magazine, load it into the machine tool, and take the pallet having the machined part thereon to load it into the magazine again. One important element for the handling robot is a gripper to safely grasp the pallet. In most of cases, the gripper must be able to grasp a high weight.

CN 107433484 describes a gripping device of a pallet exchange system that comprises a gripping device main plate and gripping device tool plates. The gripping device main plate is connected with the tail end of a gripping arm of a robot, and the gripping device tool plates are connected with standard pallets. The gripping device main plate comprises a main plate base body. Locating taper pins and a ball-holding frame are arranged on the main plate base body in an outwardly protruding mode. Each gripping device tool plate comprises a tool plate base body capable of being inserted into the ball-holding frame. As the most gripping devices for this application, the main plate and the tool plate are clamped at one position, normally in the middle of one side surface. Thus, very high clamping force is required.

Another known gripper is the RCS gripper from the company Erowa. The gripper comprises an interface element, on which the pallet can be mounted and a counterpart to be mounted to a robot. A clamping spigot is mounted on the interface element to clamp the interface element and the counterpart. The single spigot arranged on the half height of the interface element must provide a large clamping force to ensure a safe clamping. In further, the most of pallet have a certain length and width, since the interface element is sideward mounted on the pallet, the center of mass of the pallet is not positioned closely to the interface element, but is positioned at least 150 mm away from the interface element. The total weight of the pallet and the workpiece mounted thereon is normally high. The moment generated by the pallet on the clamping point must be compensated by the moment generated by the clamping spigot. Since the height of the interface element is limited and the spigot is arranged on the half height of the interface element, only a small distance can contribute to the moment generated by the clamping spigot, consequently, clamping force must be high. Such gripper has the disadvantage of limited load capacity. This means the pallet weight is limited and the safety margin in case of loss of air pressure is limited.

SUMMARY

In an embodiment, the present invention provides a gripper that is for a handling assembly and is configured to grasp an object. The gripper includes: a coupler to be mounted to the object; and a base body mountable to the handling assembly. The base body includes: a housing; a clamping bracket arranged at an outside of the housing; and a clamping mechanism arranged in the housing operationally connected to the clamping bracket. The clamping bracket has a latched state and an unlatched state. In the latched state, the clamping bracket is configured to be drawn to a position close to the housing, and in the unlatched state, the clamping bracket is configured to be pushed away from the housing to receive the coupler between the clamping bracket and the housing. The clamping mechanism is configured to be activated by pneumatic driving or hydraulic driving to force the clamping bracket to change from the latched state to the unlatched state and deactivated such that the clamping bracket is configured to return to the latched state and thereby clamping the coupler to the housing.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 1 illustrates a three-dimensional view of a pallet and a gripper in a clamped state;

FIG. 2a illustrates a three-dimensional view of the gripper from back;

FIG. 2b illustrates a three-dimensional view of the gripper from front;

FIG. 7a illustrates a three-dimensional view of the clamping bracket;

FIG. 7b, 7c illustrates a sectional view of the gripper and a detailed view of a cleaning slot;

FIG. 8a, 8b illustrate a coupling element;

FIG. 8c, 8d illustrate the pallet mounted on the coupling element at different position;

FIG. 10 illustrates the gripper with a further gripping device mounted thereon.

DETAILED DESCRIPTION

Figure 4:
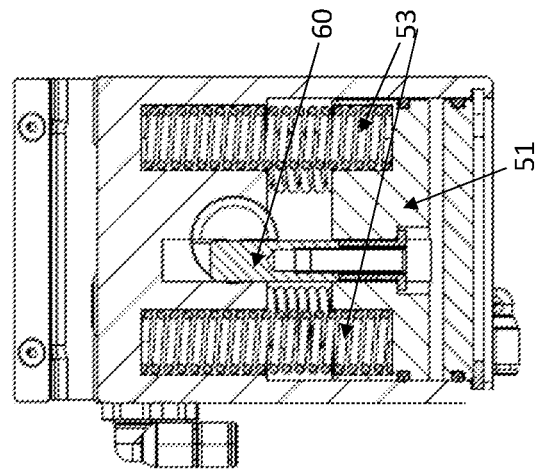
FIG. 4 illustrates a sectional view of the gripper in the horizontal plane.

Aspects of the present invention provide a gripper for automatic handling assembly to load and unload an object, in particular for a handling robot, to allow a fast and reliable grasping of the object. Aspects of the present invention also provide a compact gripper for reliably grasping a heavy object. Aspects of the present invention also provide a gripper for secured clamping an object when the air pressure is lost.

In an embodiment of the present invention, a gripper for a handling assembly to grasp an object, in particular for a handling robot, comprises a coupling element (coupler), and a base body. The base body includes a housing, a clamping bracket arranged at outside of the housing, and a clamping mechanism arranged in the housing, and operationally connected to the clamping bracket. The coupling element is securable to the object. The clamping bracket has a latched state and an unlatched state. In the latched state, the clamping bracket is drawn to a position closely to the housing, and in the unlatched state, the clamping bracket is pushed away from the housing to receive the coupling element between the clamping bracket and the housing. The clamping mechanism can be activated pneumatically or hydraulically to force the clamping bracket to change from the latched state to an unlatched state. The clamping mechanism can be deactivated such that the clamping bracket can return to the latched state and thereby clamping the coupling element to the housing. When the clamping mechanism is not activated, the clamping bracket stays at the latched state. This can further improve the safety. For example, if the air pressure applied for the gripper is too low or even drops to zero, the coupling element is still clamped to the housing by the clamping bracket, such that the coupling element and the heavy object cannot fall down. This provides a self-locking effect, which increases the safety.

In one embodiment, the clamping mechanism comprises a piston and a piston rod having one end fixedly connected to the clamping bracket and another end operationally connected to the piston to transfer the movement of the piston to the clamping bracket.

Systems for automatically loading the object, such as robot, automatic tool changer and automatic pallet changer, are widely used in the industrial environment. For example, in order to reduce the machining time to increase the production efficiency, an automatic pallet changer is applied to load the pallet into the machine tool and unload the pallet from the machine tool. Usually, the coupling element is mounted on the pallet, whereas the base body is mounted on the robot arm. When the robot arm must load or unload the pallet from the machine tool, the pallet must be first securely grasped by the gripper, such that the robot arm can perform the loading or unloading action.

The clamping bracket has a center part and two clamping jaws, which clamp the coupling element and the housing therebetween. In particular, the clamping bracket has a U-shape and the clamping jaws form the legs of the U-shape. This construction can enhance the load capacity. In particular, the pallet weight and the distance to the center of gravity as well as the maintained clamping force at loss of air pressure are higher compared to the known gripper. Preferably, the center part and the clamping jaws are made in one piece to achieve the high rigidity. The clamping force generated by the clamping bracket acts on the entire height of the coupling element and the housing thereby the clamping torque can be enhanced. The clamping bracket is configured to generate a high clamping force by amplifying the pull-in force generated by the piston, namely the clamping force is several times higher than the pull-in force. This is realized by selecting the angle between the clamping jaw and the center part in the range of 5° to 25°. This already results in a power transmission ratio of around 2:1 up to 5:1, just between clamping brackets and coupling element. For example, if the pull-in force acted by the piston rod on the clamping bracket is in the order of 4000 Newton, the clamping force acted by the clamping jaw can be in the order of 20000 Newton.

The housing has substantially a rectangular shape and is rigid. In a preferred variant, the housing has a front wall, a back wall, a top wall, a bottom wall and two sidewalls.

In one embodiment, the clamping bracket is positioned on the side of the housing and can be shifted laterally by the clamping mechanism, when the clamping bracket changes from the latched position to the unlatched position and vice versa. The coupling element having the pallet thereon can be brought into contact with the front surface of the housing and clamped by the clamping jaws therebetween. To achieve a reliable clamping, the clamping jaws has the same height as the housing and the coupling element has at least the same height as the housing, thus the clamping force is acted along the entire height of the housing, which leads to a high torque.

A coupling contact area may be formed on the coupling element to be engaged with a clamping area formed on the clamping jaw. On the front wall and/or the back wall of the housing, at least one support area is formed, on which the clamping force is affected when the coupling element is clamped to the housing.

In a particularly preferred embodiment, a cleaning hole is provided on a support area on the front surface of the housing. Since the gripper is for industry application, in particular for machining industries, it is applied in an environment with, e.g., debris and chips. If the support area is covered by debris, the clamping force can be reduced dramatically, which has a direct impact on the safety of the clamping. Thus, a clean contact surface is important. In addition, the air pressure through the cleaning hole can be measured to monitor the clamping state of the coupling element and the housing.

Furthermore, a cleaning slot is formed in the clamping bracket closely to the clamping jaws. In particular, the cleaning slot is formed between the rigid body of clamping jaw to blow air supplied through air inlets on the contact surface.

In some embodiments, the clamping mechanism comprises a retaining means, which is fixedly mounted in the housing to retain the clamping bracket in the latched position. In particular, the resetting means is mounted between an inner surface of the front wall of the housing and the piston to act on the piston a retaining force.

In an advantageous variant, the retaining means comprises at least one spring, preferably several springs are provided to generate sufficient retaining force. For example, the retaining force is in the order of 1000 Newton. In a preferred variant, the spring is compression spring. When the clamping bracket is in the unlatched state, the spring is compressed and therefore strongly pre-tensioned. When the pneumatic driving is deactivated, the compressed spring is partially released to push the piston back such that the piston rod pull the clamping bracket to the latched state. At this state, the spring is less pre-tensioned but stays pre-tensioned to provide the retaining force. Without external driving, the clamping bracket retains at the latched state.

The piston can be pneumatically or hydraulically driven to overcome the retaining force to enable the clamping bracket move from the latched position to the unlatched position, in which the clamping bracket is pushed laterally away from the housing. Preferably, the piston rod is arranged vertically on the clamping bracket and in parallel to the movement direction of the clamping bracket to push the clamping bracket away from the housing and to pull the clamping bracket back to the housing.

In one variant, the piston has a cylindrical shape and is mounted into a hole from the back wall of the housing. Springs are mounted on the piston standing in the axial direction of the piston and are pressed against the inner surface of the front wall of the housing.

In one variant, the clamping mechanism comprises a transmission means to transmit the movement of the piston into the piston rod. The transmission means enables to change axial movement of the piston into another direction, in particular, to move the piston rod in a direction orthogonal to the axial direction of the piston.

The space in the housing is limited, because the gripper should be compact. Thus, a slider is applied to serve as the transmission means. The slider is connected to the piston to follow the movement of the piston and is configured to convert the movement of piston in the axial direction defined as a first direction into the movement of the piston rod in a second direction orthogonal to the first direction. Preferably, the first direction and the second direction are in the same plane, in particular in horizontal plane.

The slider has a shape of a plate having a defined thickness and lies on the horizontal plane, which is in parallel to the top wall of the housing, with one end mounted on the piston to follow the movement of the piston. A guiding groove is formed on one surface of the slider to receive a guiding pin formed at one end of the piston rod. The piston rod has a cylindrical shape and is received in a hole drilled on the sidewall of the housing, therefore, the piston rod can substantially move only in its axial direction. The guiding pins are always engaged with the guiding groove. When the slider follows the movement of the piston, the guiding pins can travel along the guiding groove. Specially, the guiding groove runs along an inclined direction relative the axial direction of the piston. When the piston pushes the slider moving in the first direction, the inclination of the guiding groove generates a sideward force on the piston rod through the engagement of the guiding pin and the guiding groove to push the piston rods sideward.

In order to be able to compensate the production inaccuracy, the slider is mounted in a manner that its position can float in one axis around several tenth of a millimeter.

In an advantageous variant of providing high clamping force, the slider is configured to amplify the retaining force acted on the piston by the released spring to generate a clamping force to clamp the coupling element and housing, in particular, the clamping force is at least two times higher than the retaining force, preferably the clamping force is ten times higher than the retaining force. For example, the retaining force is in the order of 1000 Newton, the pull-in force acted by the piston rod on the clamping bracket is in the order of 4000 Newton, the clamping force acted by the clamping jaw is in the order of 16000 Newton.

In a preferred variant, the guiding grooves has a first portion and a second portion. The guiding groove is configured that the guiding pin can be locked in the first portion to provide a self-locking function. In a preferred variant, the first portion and the second portion have two different inclination angles α and β, which is defined relative to the axial direction of the piston. In particular, the first portion has a small inclination angle, e.g. smaller than 20 degrees, preferably about 10 degrees, and the second portion has an inclination angle larger than the first portion. When the clamping bracket is in the latched state, the guiding pin is engaged in the first portion. The small inclination angle of the first portion provides a self-locking function, thus, the clamping bracket is securely locked in the latched position. Without external driving force, the guiding pin cannot travel from the first portion to the second portion. Consequently, the coupling element is safely clamped onto the front surface of the housing. When the piston is driven pneumatically to push the slider in the direction to the front surface of the housing, the guiding pin is guided in the guiding groove and repositioned from the first portion to the second portion. A larger inclination angle in the second portion is selected such that the movement length of the piston rods and the piston are similar.

In order to ensure a secure clamping, two clamping brackets are provided and each of clamping brackets is mounted on one side of the housing to clamp the coupling element and the housing from two sides. In particular, the two sides are opposite sides. Preferably, the clamping brackets are positioned closely to the two side surfaces of the housing.

The gripper is not limited to grasp a pallet, but also for example a further gripper. Therefore, the gripper comprises a pneumatic transfer means and/or electrical transfer means to connect two pneumatic mechanisms and/or the electrical devices.

On the front surface of the housing, at least one mounting hole may be provided to receive a connecting pin formed on the coupling element. Moreover, the connecting pins and the mounting holes serve as alignment element of the gripper and the coupling element.

A more particular description of the principles briefly described above will be rendered in the following by reference to specific embodiments thereof, which are illustrated in the drawings. These drawings illustrate exemplary embodiments of the disclosure and are not therefore to be considered to limit its scope. The principles of the disclosure are described and explained with details through the use of the accompanying drawings.

FIG. 1 illustrates a three-dimensional view of a gripper 100, including a base body 20 and a coupling element 10, which can be fixedly mounted on the sidewall of a pallet 1. The base body can be mounted in a robot or a loading device. When the robot must load the pallet into a machine tool, the base body is brought closely to the coupling element having a pallet mounted thereon to receive the coupling element and clamp it as shown in the FIG. 1. Then the robot can move the pallet towards the machine tool and place the pallet on a machine table of the machine tool.

FIGS. 2a and 2b illustrate three-dimensional views of the base body 20 from the back and front, respectively. The base body 20 includes a housing 21, with a front wall 23, a back wall 22, and two sidewalls 24, and two clamping brackets 30a, 30b, each of which is provided on each side of the housing.

Figure 3:
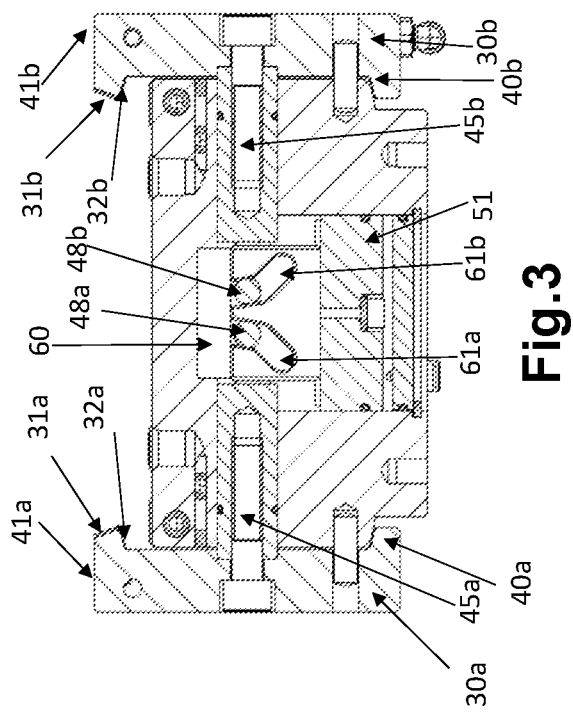
FIG. 3 illustrates a sectional view of the gripper in the vertical plane.

FIGS. 3 and 4 illustrate the sectional views of the base body in the X-Z plane and in the Y-Z plane, respectively. In these figures, the clamping brackets are in a latched state, but without clamping the coupling element. The latched state is an initial status of the clamping bracket, and it stays at this state without any drive. As shown in FIG. 3, each clamping bracket is connected to a slider 60 by a piston rod 45a, 45b. A piston 51 is arranged in the housing through a hole on the back wall of the housing, and is movable in a first direction, namely its axial direction, in this example in the Y-direction. The slider lies on the horizontal plane, namely in X-Y plane and with one end connected to the piston to follow the movement of the piston in the first direction. Each piston rod is received in a hole on the sidewall of the housing and moveable in a second direction, in this example, the X-direction. One end of the piston rod is fixedly connected to the clamping bracket and the other end is engaged with the slider.

Figure 6:
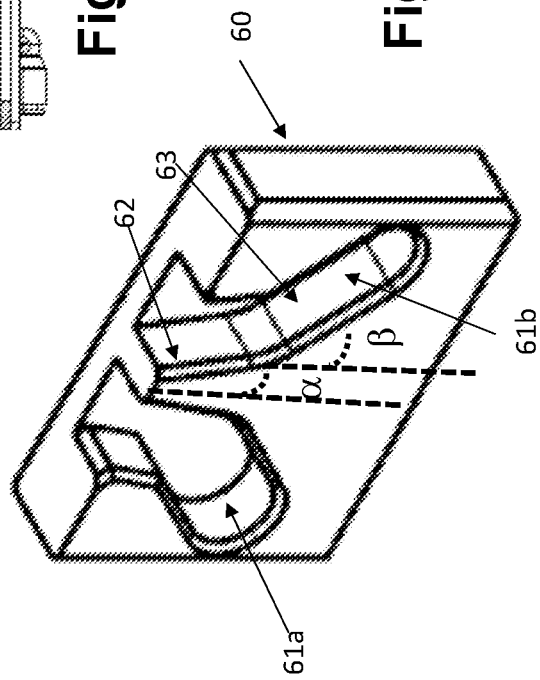
FIG. 6 illustrates a three-dimensional view of a slider.
Figure 5:
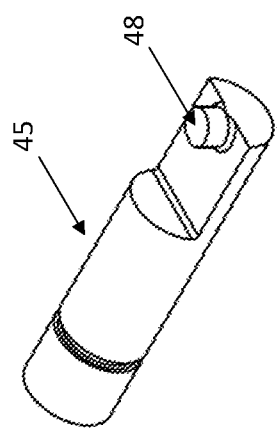
FIG. 5 illustrates a three-dimensional view of a piston rod.

FIGS. 5 and 6 show in detail the piston rod and the slider 60. A guiding pin 48 is formed on one end of the piston rod, which can be received in a guiding groove 61*a* formed in the slider such that the piston rod is engaged with the slider. As shown in FIG. 6, the slider has two guiding grooves 61*a*, 61*b*, each is formed by two portions, a first portion of guiding groove 62 and a second portion of guiding groove 63 having different inclinations. The first portion of the guiding grooves has a first angle a relative to the first direction symbolized by the dotted line and the second portion of the guiding groove has a second angle β relative to the first direction. The first angle α is smaller than the second angle β. When the clamping bracket is at the latched state, the guiding pins are located in the first portion of the guiding grooves, the smaller angle in the first portion provides the advantage of a strong engagement of the piston rod and the slider to enhance the clamping of the clamping bracket. When the clamping bracket is driven from the latched state into an unlatched state, the piston is driven to move in the first direction and the slider follows this movement such that the guiding pins are guided along the guiding grooves and move from the first portion to the second portion, the bigger angle in the second portion can ease the travelling of the guiding pins in the second portion.

As shown in FIG. 4, at least one, preferably at least two springs 53 as retaining means are mounted in the housing to retain the piston at an initial position, which is close to the back wall of the housing. The springs are mounted on the front surface of the piston and pressed against the inner surface of front wall of the housing. In the embodiment shown in FIG. 4, three springs are arranged on the upper side of the slider and three springs are arranged on the lower side of the slider.

In the latched state of the clamping bracket, the springs are rested between the piston and the inner surface of the front wall to hold the slider and the piston at the initial position, at which the guiding pin is positioned in the first portion 62 of the guiding groove. When the piston is driven by the air to move in the Y-direction, the slider is pushed by the piston in the same direction such that the guiding pins moves from the first portion to the second portion 63 of the guiding groove such that the piston rod is pushed away from the housing to reach the unlatched state. At the same time, the springs are pressed by the piston and are pre-tensioned. In the unlatched state, an object can be received on the front wall of the housing. When the air supplied to the piston is shut off, the pre-tensioned springs push the piston rearward back to the initial position. Consequently, the slider follows the movement of the piston and be shifted back to the initial position and the guiding pins travels back to the first portion of the guiding groove. Thus, the clamping bracket are pulled back towards the housing and clamp the objected received on the front wall and the housing together.

As shown in FIG. 2*b*, a pneumatic air inlet 52 is provides on the top of the housing to supply the air for driving the piston.

FIG. 7*a* shows a three-dimensional view of the clamping bracket. The clamping bracket has a U-shape having two protrusions as clamping jaws 40*a*, 40*b* on each side. Each clamping jaw has two clamping area being brought into contact with the object, when it is clamped to the housing. The first clamping jaw 40*a* has a first clamping area 31*a* at the upper end of the and a second clamping area 32*a* at the lower end and the second clamping jaw 41*a* has a third clamping area 33*a* at the upper end and a fourth clamping area 34*a* at the lower end. In the variant shown in the figures, the clamping areas have an oblique surface to ensure a high clamping force on one hand and to compensate the production tolerance. Thus, the clamping force effected on the clamping area is much higher, e.g. three times higher than the force acted by the piston rod on the clamping bracket.

As shown in FIG. 2*b*, on the outer surface of the front wall of the housing, in particular at each edge of the outer surface, a support area 58 is formed. When the coupling element and the housing are clamped by the clamping bracket, the clamping force is mainly effected on the four support areas.

When the gripper is applied for grasping the pallet mounted in a machine tool, cleaning of the clamping area is important to ensure a reliable clamping. Therefore, cleaning air channels are formed in the clamping bracket. A first pair of air outlet 36*a* is formed closely to the first clamping area 31*a* and the second clamping area 32*a*, respectively, which is connected through a fluid channel with a pair of first pair of cleaning air inlet 39*a* formed closely to the clamping area as shown in the FIG. 7*b*, which is enlarged figure of the part A of FIG. 7*c*. The arrow with the dotted lines indicate the airflow direction for an air blade cleaning. The air outlet 36*a* is formed by a small gap of less than 0.3 mm, preferably 0.1 mm between cover and bracket.

Air for cleaning can be supplied into the first pair of air inlet to blow out of the slot to clean the clamping areas. In further, each support area 58 can be cleaned by air blowing out of a cleaning hole 59 provided on the support area. Moreover, the cleaning holes can be used as a sensing unit to verify the clamping status by measuring the pressure therein.

FIGS. 8*a* and 8*b* show the details of the coupling element. In this embodiment, the coupling element has a shape of a plate, however, the coupling element is not limited to this shape. Several connecting holes 16 are provided on the coupling plate to attach it to a pallet. The height of the coupling element is larger than the pallet to increase the torque when the gripper holds the pallet. Additionally, two coupling connecting pins 15 are fixed on the coupling element to be inserted into the base body of the gripper. The connecting pins serves also as an alignment means. The coupling element is designed that coupling contact areas 11 are formed at two edges of the coupling element to be received into the clamping jaws of the clamping brackets. As shown in FIGS. 8*c* and 8*d*, the coupling element can be mounted onto the pallet with two different arrangements to allow the flexible mounting of the pallet.

Figure 9C:
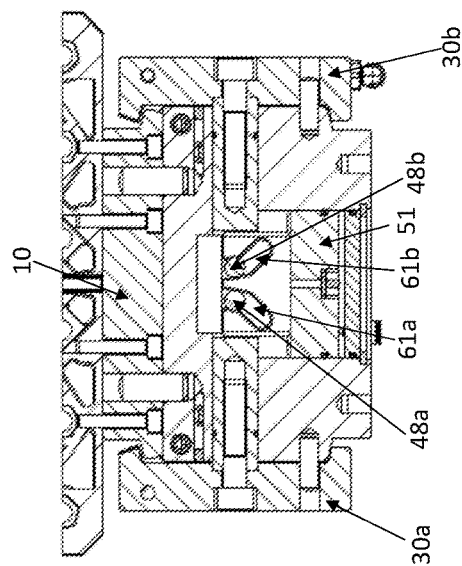
FIGS. 9a, 9b and 9c illustrate the gripper in latched and unlatched position.
Figure 9B:
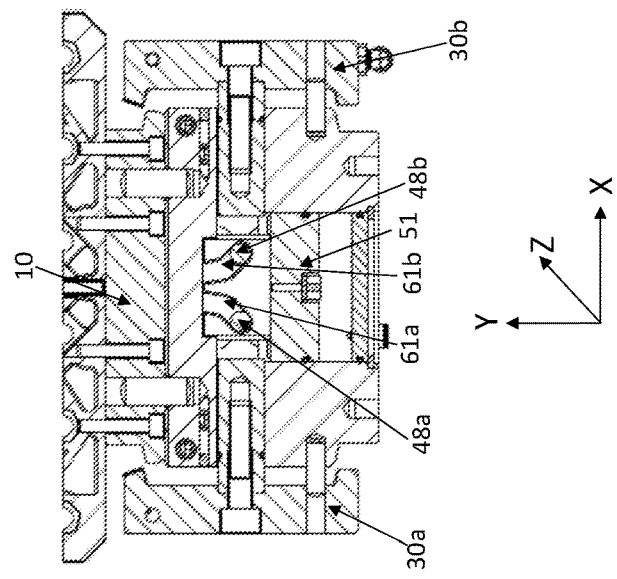
Figure 9A:
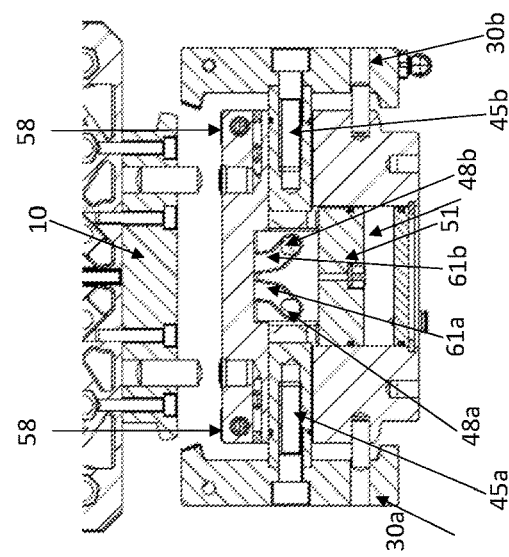

FIGS. 9*a*, 9*b* and 9*c* illustrate the operation of the grasping the pallet. FIG. 9*a* shows that the clamping bracket is opened by supplying the pneumatic air into the housing of the base body. The coupling element having the pallet thereon can be inserted into the base body. When the coupling element is inserted into the base body as shown in FIG. 9*b*, the air can be turned off. The clamping brackets clamp the coupling element to the housing from both sides.

FIG. 10 illustrates another application of the gripper. The gripper is mounted on a robot 2 and the coupling element is mounted on an additional gripper 200. As shown in FIGS. 2*a* and 2*b*, electrical transfer means 57 and pneumatic transfer means 56 are provided on the top of the housing. The electrical transfer means severs as to connect the additional gripper electrically and allows to communication between the gripper and the additional gripper, e.g. sending and receiving sensor signals. The pneumatic transfer means can transfer the pneumatic air.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMBERS 1 pallet
2 robot
10 coupling element
11 coupling contact area
15 coupling connecting pins
16 coupling connecting holes
20 base body
21 housing
22 back wall of housing
23 front wall of housing
24 sidewall of housing
30 clamping bracket
31a, 3ab first clamping area
32a, 32b second clamping area
33a, 33b third clamping area
34a, 34b fourth clamping area
36a, first pair of air outlet
39a, cleaning air inlet
40a, 40b first clamping jaw
41a, 41b second clamping jaw
45a, 45b piston rod
48a, 48b, guiding pin
51 piston
52 pneumatic air inlet
53 spring
56 pneumatic transfer means
57 electrical transfer means
58 supporting area
59 cleaning hole
60 slider
61a, 61b guiding groove
62 first portion of guiding groove
63 second portion of guiding groove
100 gripper
200 additional gripper
210 coupling element of the additional gripper

The invention claimed is:

1. A gripper for a handling assembly, the gripper being configured to grasp an object, the gripper comprising:
   a) a coupler configured to be mounted to the object; and
   b) a base body being mountable to the handling assembly, the base body comprising:
      a housing;
      a clamping bracket arranged at an outside of the housing; and
      a clamping mechanism arranged in the housing operationally connected to the clamping bracket,
   wherein the clamping bracket has a latched state and an unlatched state,
   wherein in the latched state, the clamping bracket is configured to be drawn to a position close to the housing, and in the unlatched state, the clamping bracket is configured to be pushed away from the housing to receive the coupler between the clamping bracket and the housing, and
   wherein the clamping mechanism is configured to be activated by pneumatic driving or hydraulic driving to force the clamping bracket to change from the latched state to the unlatched state, and configured to be deactivated such that the clamping bracket is configured to return to the latched state and thereby clamping the coupler to the housing.

2. The gripper according to claim 1, wherein the clamping mechanism comprises a spring mounted in the housing to retain the clamping bracket in the latched position.

3. The gripper according to claim 2, wherein the clamping mechanism comprises a piston and a piston rod having one end fixedly connected to the clamping bracket and another end operationally connected to the piston to transfer the movement of the piston to the clamping bracket.

4. The gripper according to claim 3,
   wherein the clamping mechanism comprises a slider connected between the piston rod and the piston, and
   wherein the slider is engaged with the piston rod in a manner to convert the movement of the piston in a first direction into the movement of the piston rod in a second direction, the first direction and the second direction being perpendicular to each other.

5. The gripper according claim 4, wherein the slider is connected to the piston to follow the movement of the piston and comprises a guiding groove, in which a guiding pin formed on the piston rod is engaged and is configured to travel along the guiding groove during the movement of the slider.

6. The gripper according to claim 5, wherein, the guiding groove has a first portion and a second portion,
   wherein the guiding groove is configured such that the guiding pin is lockable in the first portion, and
   wherein the first portion and the second portion have different inclination angles.

7. The gripper according to claim 6, wherein the first portion has a smaller inclination angle than an inclination angle of the second portion.

8. The gripper according to claim 4,
   wherein the spring is mounted between the piston and an inner surface of a front wall of the housing,
   wherein the spring is configured to be compressed when the clamping bracket is in the unlatched state, and wherein the compressed spring is configured to be partially released to retain the clamping bracket in the latched state.

9. The gripper according to claim 8, wherein the slider is configured to amplify a retaining force acted on the piston by the released spring to generate a clamping force to clamp the coupler and housing, the clamping force being at least two times higher than the retaining force.

10. The gripper according to claim 1, wherein the base body comprises two clamping brackets, comprising the clamping bracket, and each of clamping brackets is mounted on each side of the housing to clamp the coupler and the housing from both sides, the two sides being opposite sides.

11. The gripper according to claim 1, wherein at least one support area is on the outer surface of the housing, on which the clamping force is configured to be affected when the coupler is clamped to the housing, and wherein a cleaning hole is provided on the support area, the cleaning hole enabling detecting the clamping state.

12. The gripper according to claim 1, wherein a height of the clamping bracket is the same as a height of the base body.

13. The gripper according to claim 1, wherein the clamping bracket has a U-shape with a center part for connecting a piston rod thereon, wherein two clamping jaws protrude from the center part, and wherein the center part and the clamping jaws are formed as one part.

14. The gripper according to claim 13, wherein a cleaning outlet is provided on each of the two clamping jaws, through which air is configured to be blown out for cleaning.

15. The gripper according to claim 1, wherein a pneumatic transfer device or an electrical transfer device are provided on the housing.

16. The gripper according to claim 1, wherein the coupler has at least two connecting pins, which are configured to be inserted into at least two mounting holes provided on the housing of the base body.

* * * * *